United States Patent
Hori et al.

(10) Patent No.: US 12,067,322 B2
(45) Date of Patent: Aug. 20, 2024

(54) VEHICULAR DISPLAY CONTROL DEVICE, VEHICULAR DISPLAY DEVICE, VEHICLE, VEHICULAR DISPLAY CONTROL METHOD, AND NON-TRANSITORY COMPUTER-READABLE RECORDING MEDIUM RECORDED WITH VEHICULAR DISPLAY CONTROL PROGRAM

(71) Applicant: TOYOTA JIDOSHA KABUSHIKI KAISHA, Toyota (JP)

(72) Inventors: Keigo Hori, Toyota (JP); Ryota Hamabe, Nisshin (JP); Takahiro Hirota, Nukata-gun (JP); Yoshinori Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 17/879,844

(22) Filed: Aug. 3, 2022

(65) Prior Publication Data

US 2023/0097248 A1 Mar. 30, 2023

(30) Foreign Application Priority Data

Sep. 24, 2021 (JP) .................................. 2021-156129

(51) Int. Cl.
*G06F 3/14* (2006.01)
*B60K 35/00* (2024.01)
*B60K 35/21* (2024.01)
*B60K 35/28* (2024.01)

(52) U.S. Cl.
CPC ............... *G06F 3/14* (2013.01); *B60K 35/00* (2013.01); *B60K 35/214* (2024.01); *B60K 35/28* (2024.01); *B60K 2360/167* (2024.01); *B60K 2360/68* (2024.01)

(58) Field of Classification Search
None
See application file for complete search history.

(56) References Cited

U.S. PATENT DOCUMENTS

| | | | |
|---|---|---|---|
| 6,906,634 B1 | 6/2005 | Kuenzner et al. | |
| 2010/0315218 A1* | 12/2010 | Cades ................... | B60K 35/00 340/441 |
| 2014/0182508 A1* | 7/2014 | Oishi ...................... | G01P 1/11 116/62.3 |
| 2015/0109756 A1* | 4/2015 | Choi ...................... | G01D 7/002 362/23.01 |
| 2018/0162225 A1* | 6/2018 | Webb .................... | B60K 35/00 |

(Continued)

FOREIGN PATENT DOCUMENTS

| | | |
|---|---|---|
| JP | 2003-510586 A | 3/2003 |
| JP | 2009-103540 A | 5/2009 |

(Continued)

*Primary Examiner* — Ryan M Gray
(74) *Attorney, Agent, or Firm* — Oliff PLC

(57) ABSTRACT

A vehicular display control device is configured to: acquire a physical quantity relating to a travel state of a vehicle; in a display region for displaying a predetermined range of the vehicle travel state-related physical quantity in increments using numerical values, change a display format of the numerical values based on the acquired vehicle travel state-related physical quantity; and display the numerical values for which the display format has been changed on a display including the display region.

14 Claims, 11 Drawing Sheets

(56) References Cited

U.S. PATENT DOCUMENTS

| | | | |
|---|---|---|---|
| 2018/0186235 A1* | 7/2018 | Van Laack | G01P 1/10 |
| 2019/0351766 A1* | 11/2019 | Spivak | B60Q 3/64 |
| 2023/0097248 A1* | 3/2023 | Hori | B60K 35/29 |
| | | | 345/581 |
| 2023/0361569 A1* | 11/2023 | Kosuth | H02J 3/381 |
| 2024/0012432 A1* | 1/2024 | Wiegman | G05B 13/027 |

FOREIGN PATENT DOCUMENTS

| | | |
|---|---|---|
| JP | 2010-266288 A | 11/2010 |
| JP | 2014-102077 A | 6/2014 |

\* cited by examiner

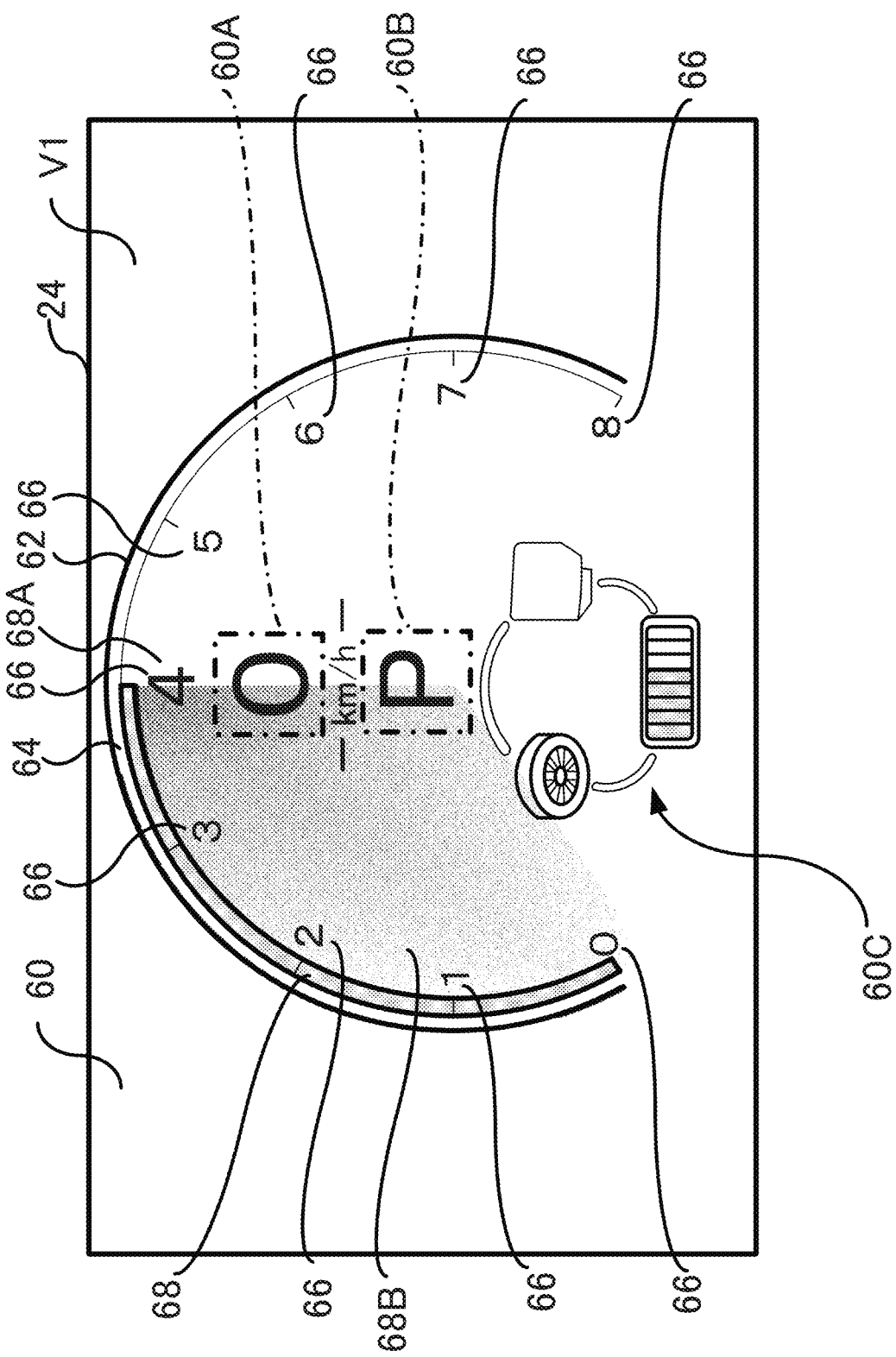

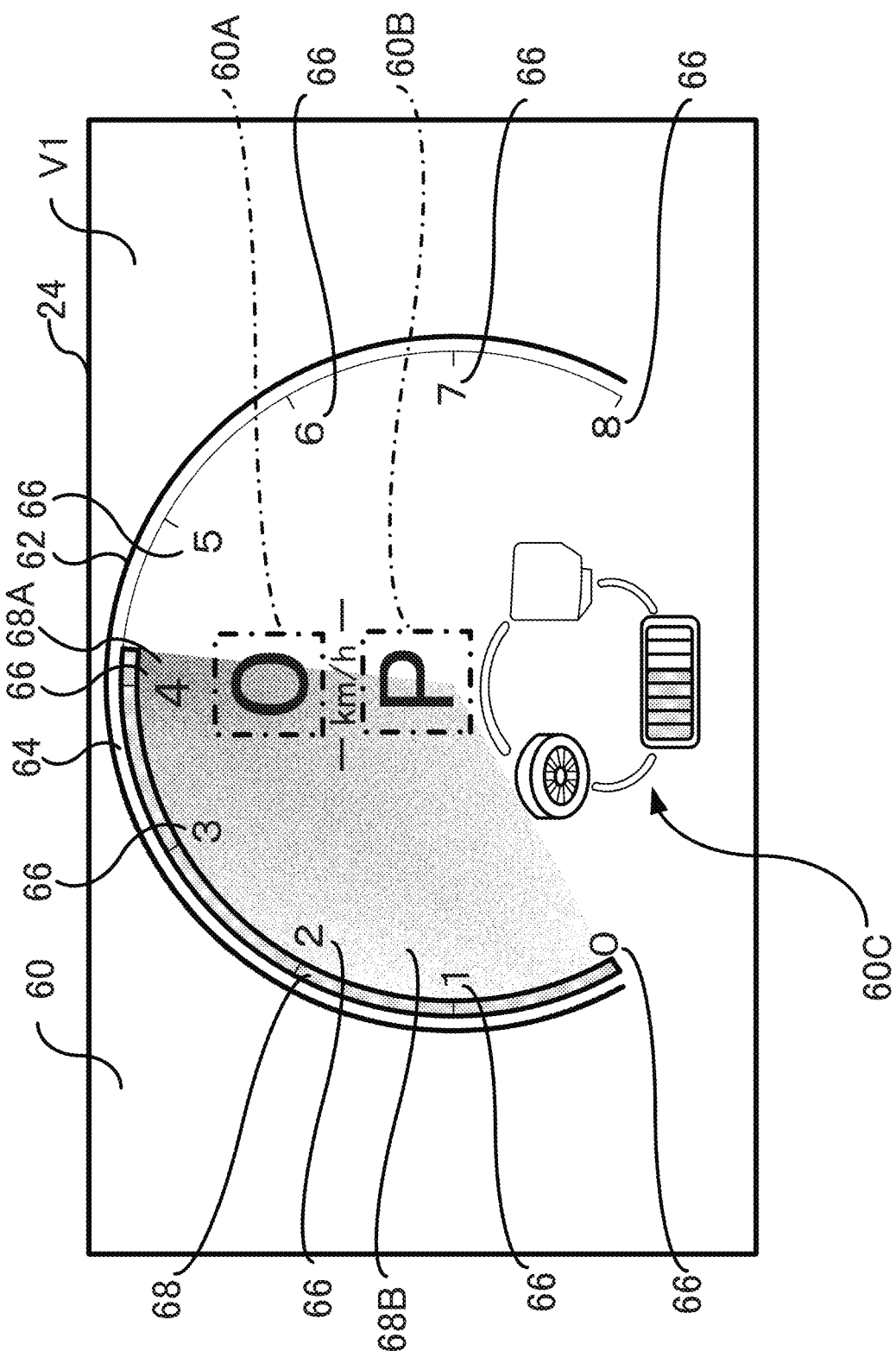

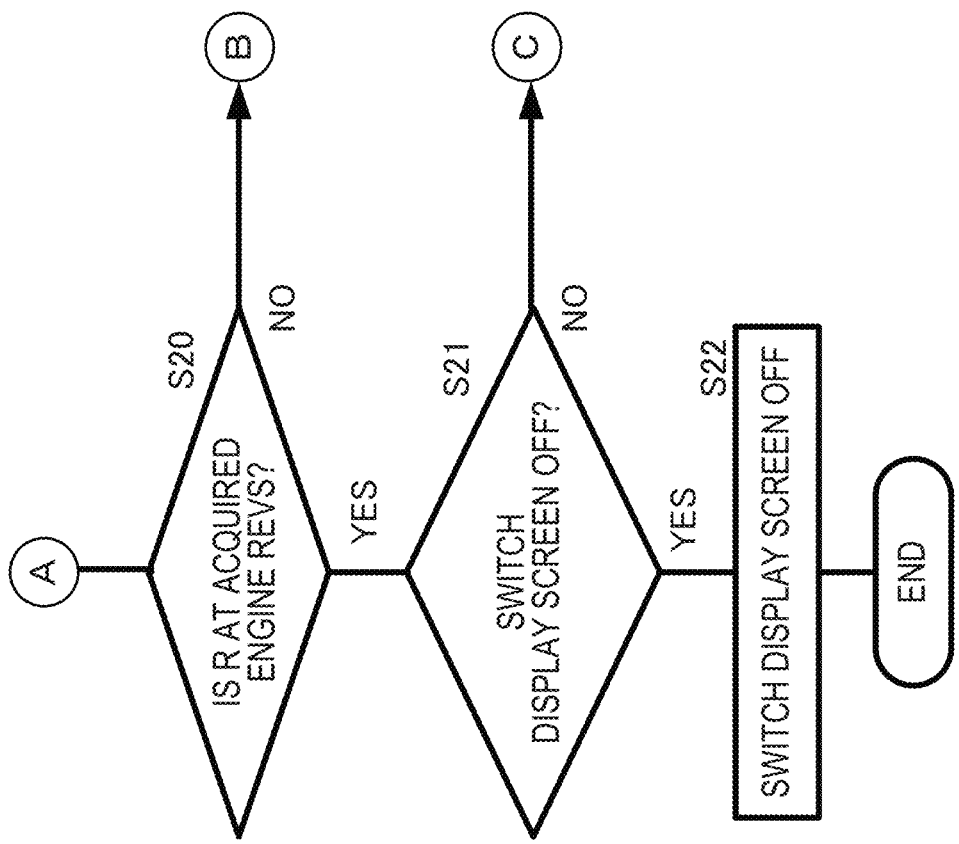

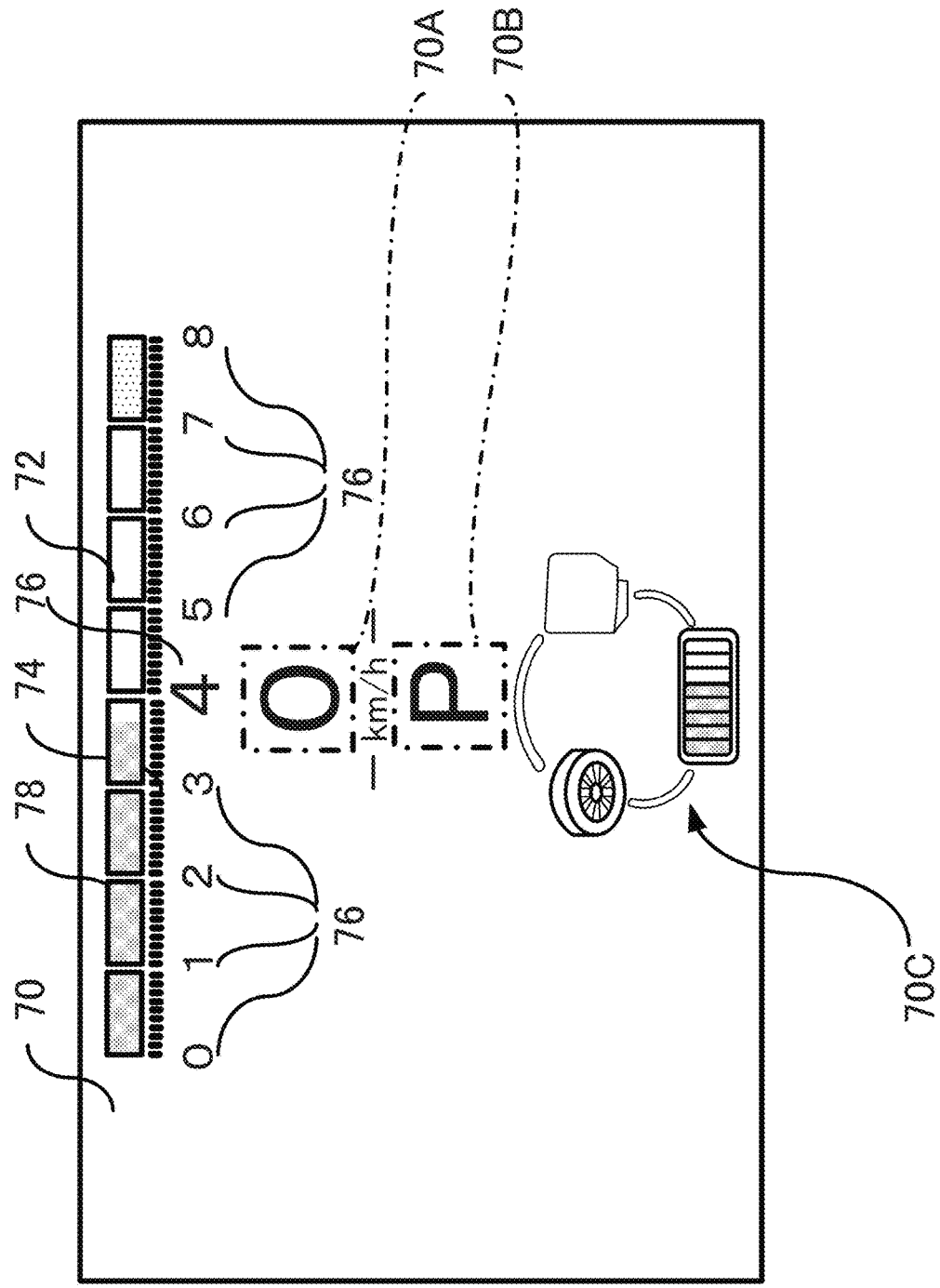

VEHICULAR DISPLAY CONTROL DEVICE, VEHICULAR DISPLAY DEVICE, VEHICLE, VEHICULAR DISPLAY CONTROL METHOD, AND NON-TRANSITORY COMPUTER-READABLE RECORDING MEDIUM RECORDED WITH VEHICULAR DISPLAY CONTROL PROGRAM

CROSS-REFERENCE TO RELATED APPLICATION

This application is based on and claims priority under 35 USC 119 from Japanese Patent Application No. 2021-156129 filed on Sep. 24, 2021, the disclosure of which is incorporated by reference herein.

BACKGROUND

Technical Field

The present disclosure relates to a vehicular display control device, a vehicular display device, a vehicle, a vehicular display control method, and a non-transitory computer-readable recording medium recorded with a vehicular display control program.

Background Art

Japanese Patent Application Laid-Open (JP-A) No. 2009-103540 discloses a meter display in which an image of an analog speedometer is displayed together with an image of a digital speedometer. In this meter display, a numerical image indicating speed on the digital speedometer becomes larger as the speed becomes faster, such that a display format of the digital speedometer with respect to the analog speedometer is changed in coordination with the analog speedometer.

However, although the numerical value on the digital speedometer is easy to identify in the technology disclosed in JP-A No. 2009-103540, it does not contribute to the ease of viewing of the analog speedometer, and so improvement is desired regarding this point.

SUMMARY

An aspect of the present disclosure is a vehicular display control device, that includes: a memory: and a processor coupled to the memory, the processor being configured to: acquire a physical quantity relating to a travel state of a vehicle; in a display region for displaying a predetermined range of the vehicle travel state-related physical quantity in increments using numerical values, change a display format of the numerical values based on the acquired vehicle travel state-related physical quantity; and display the numerical values for which the display format has been changed on a display including the display region.

BRIEF DESCRIPTION OF DRAWINGS

FIG. 6 is a diagram illustrating an example of a display on a display section of an exemplary embodiment when engine revs are at 4000 rpm;

FIG. 7 is a diagram illustrating an example of a display on a display section of an exemplary embodiment when engine revs are at 4200 rpm;

FIG. 8B is a flowchart (2) illustrating an example of a flow of display processing in an exemplary embodiment;

FIG. 10 is a diagram illustrating an example of a display on a display section of an exemplary embodiment when engine revs are at 3700 rpm in a sports mode.

DETAILED DESCRIPTION

Explanation follows regarding a vehicle 12 installed with a vehicular display device 10 according to an exemplary embodiment of the present disclosure, with reference to the drawings. Note that in FIG. 1, the arrow UP indicates a vehicle vertical direction upper side, and the arrow RH indicates a vehicle width direction right side. In the following explanation, references to up and down and left and right respectively refer to up and down in the vehicle vertical direction and left and right in the vehicle width direction.

Figure 1:
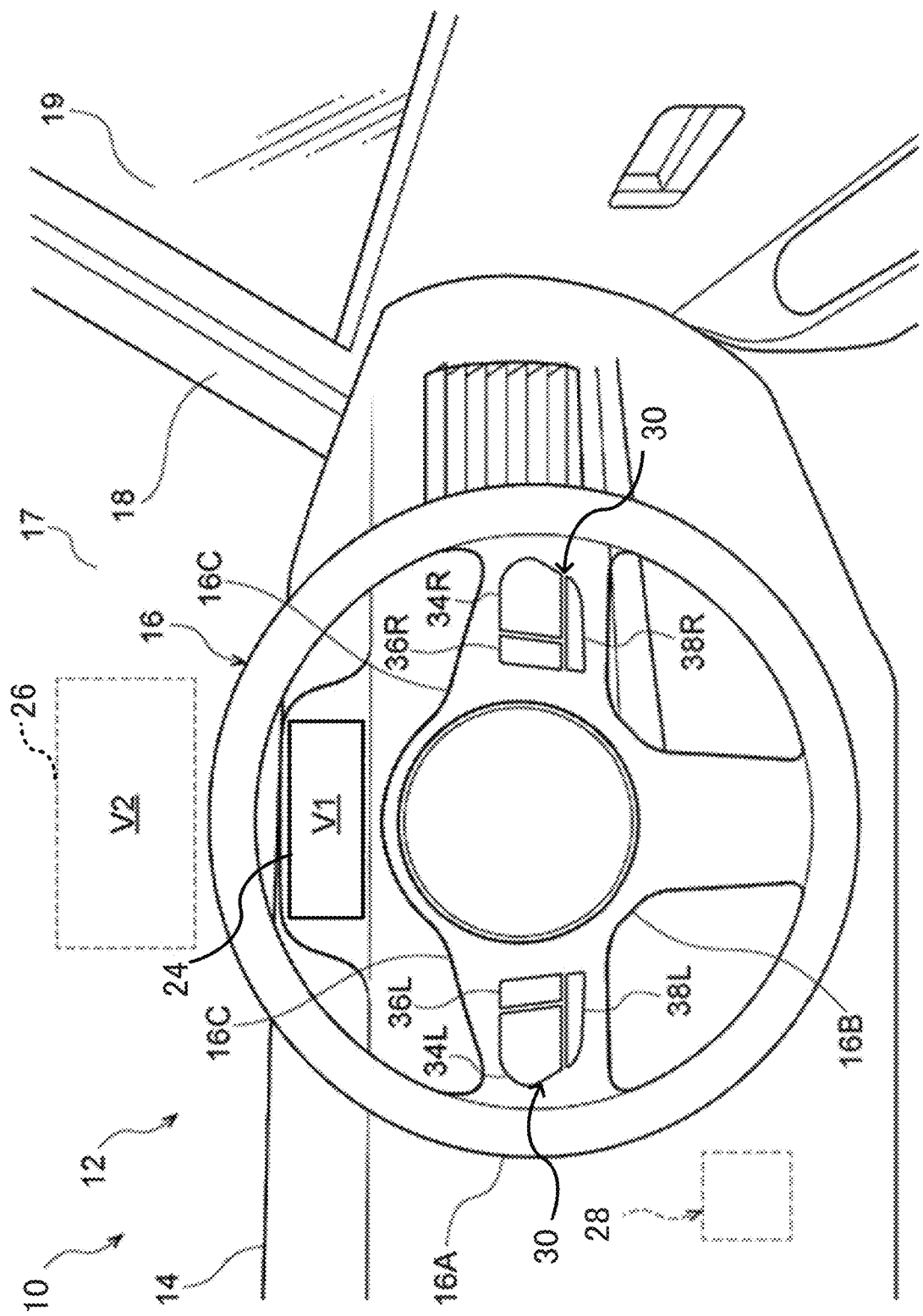
FIG. 1 is a schematic view illustrating an example of a front section inside a vehicle cabin of a vehicle applied with a vehicular display device according to an exemplary embodiment, as viewed from a vehicle rear side.

As illustrated in FIG. 1, an instrument panel 14 is provided at a front section inside a vehicle cabin 13 of the vehicle 12. The instrument panel 14 extends along the vehicle width direction, and a steering wheel 16 is provided at the vehicle right side of the instrument panel 14. Namely, in the present exemplary embodiment as an example, the vehicle is what is referred to as a right-hand drive vehicle in which the steering wheel 16 is provided on the right side and a driving seat is set on the vehicle right side.

The steering wheel 16 includes a substantially circular ring-shaped rim 16A, and a hub 16B configuring a central section is provided at an inner circumferential side of the rim 16A. A right side of the rim 16A and the hub 16B are coupled together by a spoke 16C, and a left side of the rim 16A and the hub 16B are similarly coupled together by a spoke 16C. The hub 16B is fixed to a vehicle rear side end of a steering shaft such that the steering wheel 16 is rotatably supported by the vehicle body. The vehicle 12 is steered by rotation-operating the steering wheel 16 (rim 16A) so as to rotate the steering shaft.

Steering switches 30, described below, are located on the spokes 16C of the steering wheel 16. The steering switches 30 can be operated by an occupant. Note that in FIG. 1, the steering wheel 16 is illustrated in a state in which the vehicle is proceeding straight ahead.

The steering switches 30 include a first right-side operation switch 34R, a second right-side operation switch 36R, a right-side function switchover switch 38R, a first left-side operation switch 34L, a second left-side operation switch 36L, and a left-side function switchover switch 38L. The first right-side operation switch 34R, the second right-side operation switch 36R, and the right-side function switchover switch 38R are provided on the right spoke 16C. The first left-side operation switch 34L, the second left-side operation switch 36L, and the left-side function switchover switch 38L are provided on the left spoke 16C. In the present exemplary embodiment as an example, a static sensor is installed to each of the switches, and the occupant selects a function simply by touching the corresponding switch. While in this function-selected state, the occupant the presses the first right-side operation switch 34R to execute the selected function.

A windshield 17 is provided at a front end portion of the instrument panel 14. The windshield 17 extends along the vehicle vertical direction and the vehicle width direction so as to partition between the vehicle cabin interior and the vehicle cabin exterior.

A vehicle right side front pillar 18 is fixed to a vehicle right side end portion of the windshield 17. The front pillar 18 extends along the vehicle vertical direction, and the windshield 17 is fixed to a vehicle width direction inside end portion of the front pillar 18. A front end portion of a front side glass 19 is fixed to a vehicle width direction outside end portion of the front pillar 18. Note that a vehicle left side end portion of the windshield 17 is fixed to a vehicle left side front pillar.

A first display section (first display) 24 including an image display region V1 is provided to the instrument panel 14. The image display region V1 is configured by a meter display provided at the vehicle front side of the driving seat and located on the vehicle right side of the instrument panel 14. Various meter equipment installed in the vehicle 12 is connected to the first display section 24, and the display region V1 is provided at a position that enters the field of view of a driver in a state in which the driver is directing their gaze toward the vehicle front side.

A second display section (second display) 26 including an image display region V2 is provided to the windshield 17. The display region V2 is set at the vehicle upper side of the image display region V1. The display region V2 is configured by a projection surface that a head-up display device 44 (see FIG. 2) projects onto. More particularly, the head-up display device 44 is provided at the vehicle front side of the instrument panel 14, and an image is projected from the head-up display device 44 onto the display region V2 of the second display section 26 of the windshield 17. Namely, the display region V2 is configured by a part of the windshield 17 configuring the projection surface of the head-up display device 44.

Hardware Configuration of Vehicular Display Device 10

Figure 2:
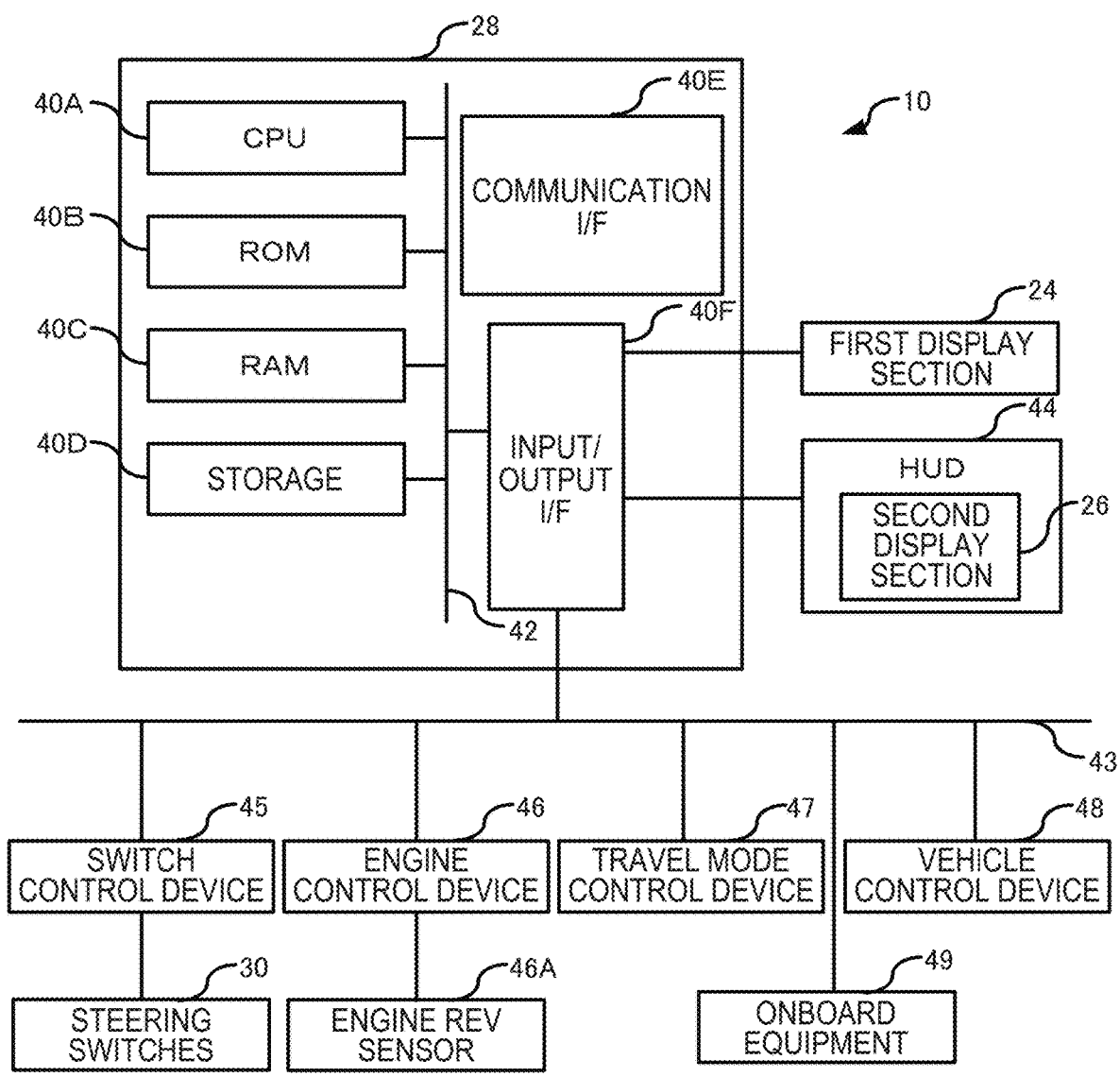
FIG. 2 is a block diagram illustrating an example of a hardware configuration of a vehicular display device according to an exemplary embodiment.

A display control electronic control unit (ECU) 28, serving as a vehicular display control device that is a control section of the vehicular display device 10, is provided to the vehicle 12. FIG. 2 is a block diagram illustrating a hardware configuration of the vehicular display device 10.

As illustrated in FIG. 2, the display control ECU 28 of the vehicular display device 10 is configured including a central processing unit (CPU; processor) 40A, read only memory (ROM) 40B, random access memory (RAM) 40C, storage 40I), a communication interface (I/F) 40E, and an input/output interface (I/F) 40F. The respective configuration is connected so as to be capable of communicating with one another through a bus 42.

The CPU 40A is an example of a hardware processor and is a central processing unit that executes various programs and controls various sections. Namely, the CPU 40A loads a program from the ROM 40B that is an example of memory or the storage 40D, and executes the program using the RAM 40C as a workspace. The CPU 40A controls the respective configuration and performs various computation processing according to programs recorded in the ROM 40B or the storage 40D.

The ROM 40B holds various programs and various data. The RAM 40C acts as a workspace to temporarily store programs and data. The storage 40D is configured by a hard disk drive (HDD) or a solid state drive (SSD), and holds various programs including an operating system, as well as various data. In the present exemplary embodiment, a program for performing display processing, various data, and so on are held in the ROM 40B or the storage 40D.

The communication I/F 40E is an interface allowing the vehicular display device 10 to communicate with a server and other equipment, and a protocol such as Ethernet (registered trademark), LTE, FDDI, or Wi-Fi (registered trademark) may be employed therefor.

The first display section 24 and the head-up display device (HLD) 44 are connected to the input/output I/F 40F. Images are projected onto the display region V2 of the second display section 26 by the head-up display device 44.

A system bus 43 routed in the vehicle 12 is also connected to the input/output I/F 40F. A switch control device 45, an engine control device 46, a travel mode control device 47, a vehicle control device 48, onboard equipment 49, and so on are connected to the system bus 43.

Various switches serving as selection mechanisms and setting mechanisms, including the steering switches 30, are connected to the switch control device 45 that controls input from these various switches. In the present exemplary embodiment, the switch control device 45 detects operating states of the steering switches 30, and outputs these operating states to the display control ECU 28 through the system bus 43.

Various sensors for controlling engine operation are connected to the engine control device 46. In the present exemplary embodiment, an engine rev sensor 46A that detects engine revs is connected to the engine control device 46. The engine control device 46 controls engine operation based on detection results from various sensors including the engine rev sensor 46A. The engine control device 46 also transmits a signal indicating the engine revs detected by the engine rev sensor 46A to the input/output I/F 40F.

The travel mode control device 47 controls travel modes of the vehicle 12. The vehicle 12 includes plural preset travel modes. In the present exemplary embodiment as an example, the plural travel modes are configured of three travel modes, these being a normal mode, an eco mode, and a sports mode. The normal mode is the normally set mode which enables driving in a fuel-efficient state while attaining dynamic performance. The eco mode is a fuel-efficient travel mode which enables driving in a state prioritizing fuel efficiency over dynamic performance compared to the normal mode. The sports mode is a high-power travel mode which enables driving in a state prioritizing dynamic performance over fuel efficiency compared to the normal mode. Note that directly after starting up the vehicle 12, the travel mode is set to the normal mode. The travel mode control device 47 transmits a signal indicating a selected travel mode to the input/output I/F 40F based on for example an operation to select this travel mode using the steering switches 30.

Various control ECUs, such as a vehicle control ECU that undertakes vehicle control including travel control, a steering control ECU that performs steering control, a braking control ECU that performs braking control, and a transmission control ECU that performs control of the transmission, are installed in the vehicle control device 48. Advanced driver-assistance system (ADAS) devices, such as a function for maintaining vehicle speed and inter-vehicle distance from the vehicle in front (an adaptive cruise control (ACC) function), serving as a travel assistance function for maintaining a safe distance from the vehicle in front, and a function assisting part of steering wheel operation in order to warn of the possibility of veering out of the vehicle lane or track and avoiding veering out of the vehicle lane or track (a lane keeping assist (LKA) function) are also installed. The vehicle control device 48 operates in coordination with the engine control device 46 and the various control ECUs to control travel of the vehicle 12. The ADAS devices in the vehicle 12 may also coordinate with the engine control device 46 and the vehicle control device 48 to operate as driving assistance devices and implement a driving assistance function to assist driving operations by the occupant.

The onboard equipment 49 is configured of various equipment installed in the vehicle 12, such as various equipment including an air conditioner, an audio system, a car navigation system, and an audio input system, as well as various sensor equipment including cameras, radar, light detection and ranging (or laser imaging detection and ranging; LIDAR), and a global positioning system (GPS) sensor.

Functional Configuration of Display Control ECU 28

The display control ECU 28 implements various functionality using the above-described hardware resources. Explanation follows regarding functional configuration implemented by the display control ECU 28, with reference to FIG. 3.

Figure 3:
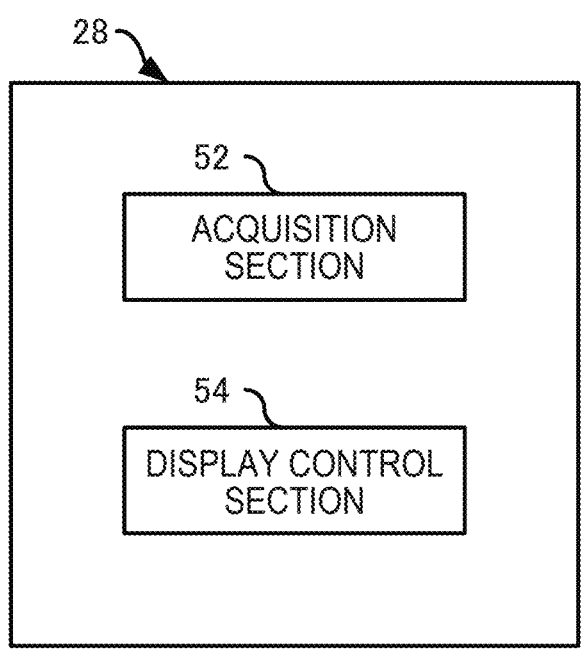
FIG. 3 is a block diagram illustrating an example of a functional configuration of a vehicular display control device according to an exemplary embodiment.

As illustrated in FIG. 3, the display control ECU 28 is configured including an acquisition section 52 and a display control section 54 as functional configuration. Note that the respective functional configuration is implemented by the CPU 40A loading a program stored in the ROM 40B or the storage 40D, and executing this program.

The acquisition section 52 acquires a physical quantity relating to a travel state of the vehicle 12. In the present exemplary embodiment, the current engine revs of the vehicle 12 is acquired as the physical quantity relating to a travel state of the vehicle 12. As an example, the acquisition section 52 of the present exemplary embodiment acquires the current engine revs by acquiring the signal indicating the engine revs transmitted by the engine control device 46 through the input/output I/F 40F.

The display control section 54 acquires information according to the travel state and operating states of the vehicle 12 through the system bus 43, and displays images based on the acquired information in the image display region V1 of the first display section 24 serving as a display screen, and in the display region V2 of the second display section 26 via the HUD 44. When the vehicle 12 is in a normal state, the information displayed in the image display region V1 of the first display section 24 and an image format for displaying this information are decided by the display control ECU 28.

Figure 4:
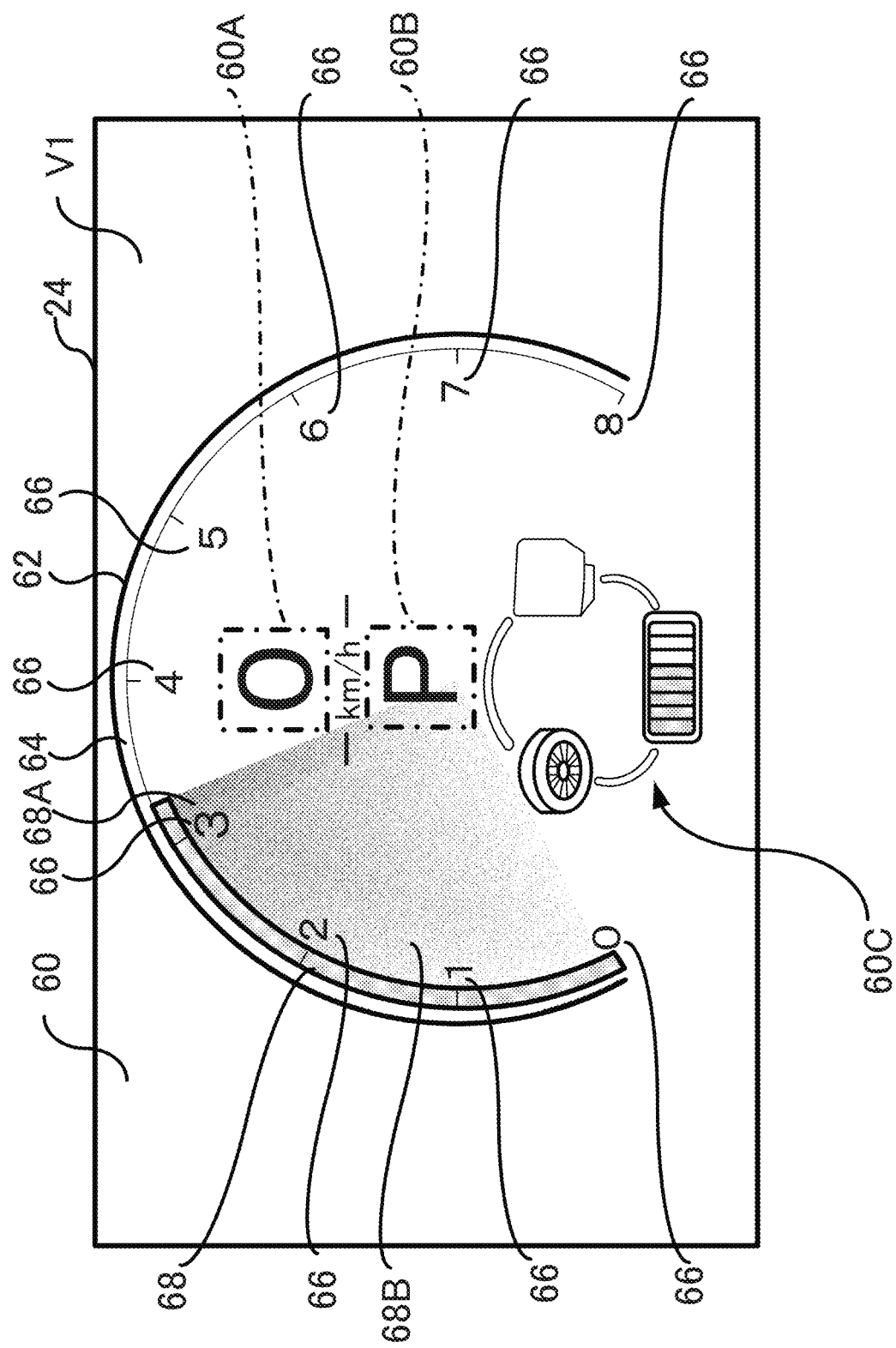
FIG. 4 is a diagram illustrating an example of a display on a display section of an exemplary embodiment when engine revs are at 3300 rpm.

As illustrated in FIG. 4, a substantially rectangular image 60, serving as a display screen, is displayed in the image display region V1 of the first display section 24. The image 60 is an image indicating the engine revs in which a tachometer image 62 for indicating the engine revs is located at a central portion thereof. A narrow-width calibrated scale 64 with a circular arc shape is arrayed around a circumferential direction in the tachometer image 62. A range of the engine revs spanning from 0 rpm to 8000 rpm is displayed in increments using numerical values 66 from "1" to "8" on the calibrated scale 64. Note that "×1000" may also be displayed in the image display region V1 so as to indicate that the engine revs is a value obtained by multiplying the numerical value indicated on the calibrated scale 64 by 1000.

A colored number bar (bar) 68 indicating the current engine revs is located alongside the calibrated scale 64. A circumferential direction left side end of the number bar 68 is at 0 rpm, and a right side end of the number bar 68 extend or contracts according to the engine revs so as to display the engine revs. Namely, the current engine revs is a value obtained by multiplying the numerical value indicated by the circumferential direction right side end of the number bar 68 by 1000. A swept region 68B is displayed spanning from the center of the circular arc configuring the number bar 68 to a radial direction end of the number bar 68. The swept region 68B is displayed with a gradation on progression clockwise around the circumferential direction from 0 rpm so as to emphasize a leading end side 68A thereof. The swept region 68B includes the number bar 68, such that the number bar 68 is also displayed with a gradation on progression clockwise around the circumferential direction from 0 rpm so as to emphasize the leading end side 68A thereof. In the present exemplary embodiment, the number bar 68 in the swept region 68B is displayed more emphatically than other regions.

Note that in the present exemplary embodiment as an example, the display control section 54 displays the swept region 68B with a gradation on progression clockwise around the circumferential direction from 0 rpm by deepening the color and increasing the brightness so as to emphasize the leading end side 68A. Note that the present disclosure is not limited thereto, and the leading end side 68A may be emphasized by deepening the color alone or by increasing the brightness alone. As long as the leading end side 68A can be emphasized, another method may be employed.

A central portion of the image 60 configures a shift display region 60B. A shift position of the transmission is displayed in the shift display region 60B, and this display is changed when the shift position of the transmission changes. An upper side of the shift display region 60B in the image 60 configures a vehicle speed display region 60A. A numerical value corresponding to the vehicle speed of the vehicle 12 is displayed in the vehicle speed display region 60A. In the present exemplary embodiment as an example, the shift display region 60B and the vehicle speed display region 60A are displayed as rectangular regions indicated by single-dotted dashed lines.

A rectangular display region 60C is located below the shift display region 60B in the image 60. The display control section 54 receives information or information-related images relating to phenomena that should be reported from the vehicle control device 48 and the respective onboard equipment 49 of the vehicle 12, selects a display screen for display in the display region 60C from out of plural display screens based on the received information, and displays this display screen in the display region 60C. Note that these plural display screens are for example stored in the storage 401) as image data representing the respective display screens.

As an example, the plural display screens include driving information for providing traffic information, road information, and so on received through the communication I/F 40E, driving information for providing fuel efficiency information and so on regarding the vehicle 12, an energy monitor for providing information indicating a relationship between the tires, battery, and energy, and an audio status screen for providing an audio operating status. The display control section 54 switches between these display screens for display in the display region 60C. Note that the display control section 54 may for example switch between display of these plural display screens based on operation using the steering switches 30. In FIG. 4 as an example, an energy monitor is displayed in the display region 60C.

In the present exemplary embodiment, the display control section 54 changes a display format of the numerical values 66 "1" to "8" based on the current engine revs of the vehicle 12 acquired by the acquisition section. More particularly, plural items of image data configured by plural layouts and display formats are for example pre-stored in the storage 40D, and the display format of the image display region V1 is changed by the display control section 54 acquiring corresponding image data from the plural items of image data stored in the storage 40D and displaying a display screen in the image display region V1 based on the acquired image data.

The display control section 54 displays the number bar 68 such that the right side end of the number bar 68 gradually extends or gradually retracts until it reaches a value that is the current engine revs divided by 1000. When doing so, the display control section 54 changes the display format of the numerical values 66 according to the position of the right side end of the number bar 68. For example, suppose the acquisition section 52 acquires 4200 rpm as the current engine revs of the vehicle 12. In such a case, the display control section 54 gradually extends the number bar 68 around the circumferential direction from the numerical value 66 "0" side to the position of "4.2". When doing so, the display control section 54 displays any numerical values 66 included in the value indicated by the right side end of the number bar 68 with a greater brightness than the other numerical values 66. Namely, the tone of the numerical values 66 included in the value indicated by the right side end of the number bar 68 is intensified.

The display control section 54 also emphatically displays the numerical value 66 that is numerically closest to the right side end of the number bar 68 when it passes compared to the other numerical values 66. Explanation follows regarding an example in which the current position of the right side end of the number bar 68 is a position R, and this position R passes 3300 rpm, 3700 rpm, and 4000 rpm as revs prior to the engine revs reaching 4200 rpm.

As illustrated in FIG. 4, when the position R passes 3300 rpm, the display control section 54 causes the position R to pass the position "3.3" between the numerical value 66 "3" and the numerical value 66 "4" on the calibrated scale 64. When doing so, since "3.3" is a numerical value that is numerically closer to "3" than to "4", the display control section 54 displays the numerical value 66 "3" more emphatically than the other numerical values 66. In the present exemplary embodiment, the display control section 54 displays the numerical value 66 "3" larger than the other numerical values 66. For example, in cases in which the numerical values 66 other than the numerical value 66 "3" are displayed as small size, the numerical value 66 "3" is displayed as medium size.

Figure 5:
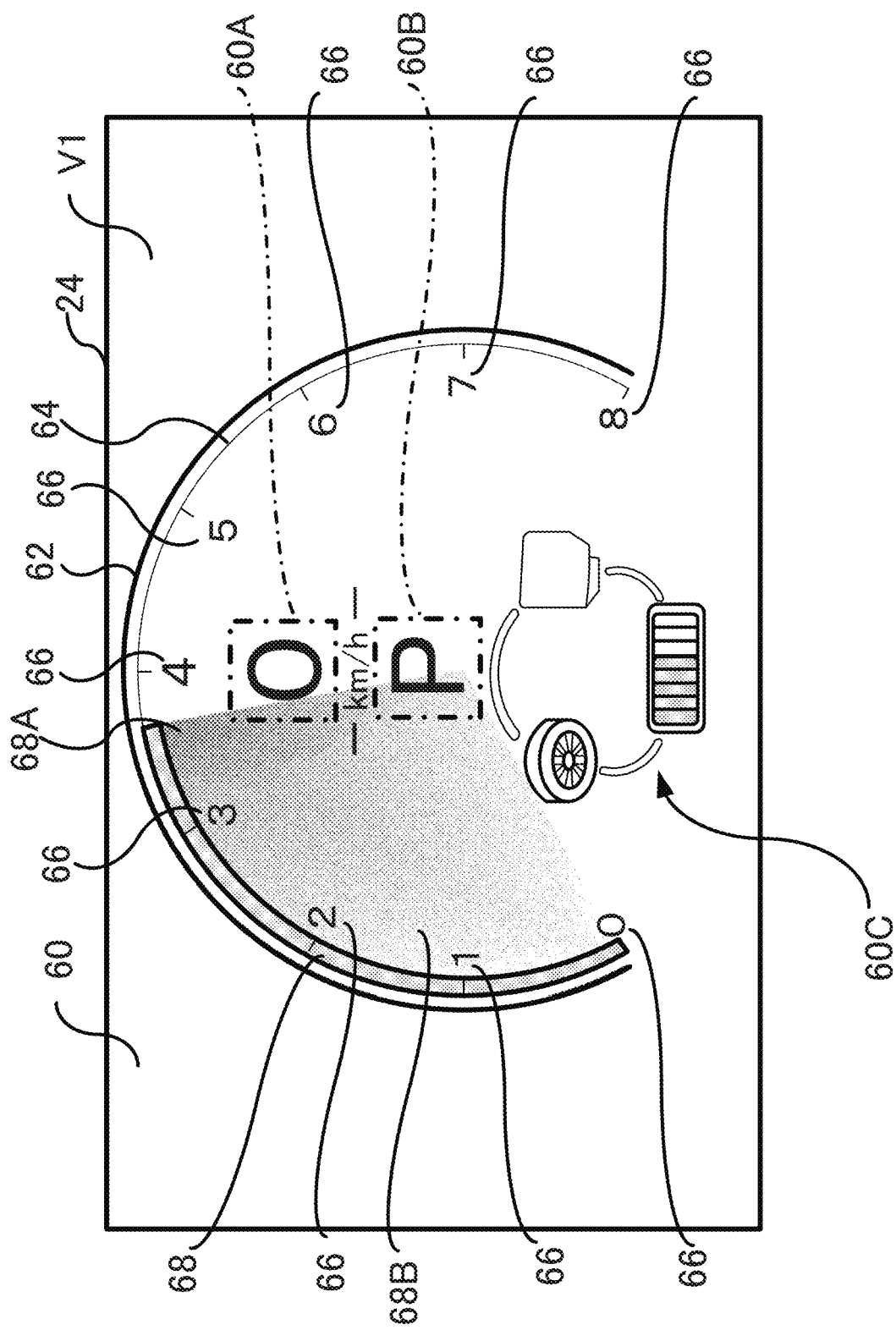
FIG. 5 is a diagram illustrating an example of a display on a display section of an exemplary embodiment when engine revs are at 3700 rpm.

As illustrated in FIG. 5, when passing 3700 rpm, the display control section 54 causes the position R to pass the position "3.7" between the numerical value 66 "3" and the numerical value 66 "4" on the calibrated scale 64. When doing so, since "3.7" is a numerical value that is numerically closer to "4" than to "3", the display control section 54 displays the numerical value 66 "4" more emphatically than the other numerical values 66. In the present exemplary embodiment, the display control section 54 displays the numerical value 66 "4" larger than the other numerical values 66. For example, in cases in which the numerical values 66 other than the numerical value 66 "4" are displayed as small size, the numerical value 66 "4" is displayed as medium size. Note that when doing so, the display control section 54 reduces the size of the numerical value 66 "3" compared to its size when the position R passed the position "33". Namely, the numerical value 66 "3" is returned to its original small size.

As illustrated in FIG. 6, when passing 4000 rpm, the display control section 54 causes the position R to pass the numerical value 66 "4" on the calibrated scale 64. When doing so, the numerical value 66 "4" is displayed more emphatically than the other numerical values 66. In the present exemplary embodiment, the display control section 54 displays the numerical value 66 "4" larger than the other numerical values 66, and further displays the numerical value 66 "4" larger than its size when the position R passed "13.2" and "3.7" as described above. Namely, in cases in which the numerical values 66 other than the numerical value 66 "4" are displayed as small size, the numerical value 66 "4" is displayed as large size. Note that in a similar manner, when the position R is passing 1000 rpm, 2000 rpm, or 3000 rpm, the display control section 54 causes the corresponding numerical value 66 "1", numerical value 66 "2", or numerical value 66 "3" to be displayed as large size similarly to the numerical value 66 "4" in this case.

As illustrated in FIG. 7, when reaching 4200 rpm, the display control section 54 causes the position R to reach the position "4.2" between the numerical value 66 "5" and the numerical value 66 "4" on the calibrated scale 64. When doing so, since "4.2" is a numerical value that is numerically closer to "4" than to "5", the display control section 54 displays the numerical value 66 "4" more emphatically than the other numerical values 66. In the present exemplary embodiment, the display control section 54 displays the numerical value 66 "4" larger than the other numerical values 66. For example, in cases in which the numerical values 66 other than the numerical value 66 "4" are displayed as small size, the numerical value 66 "4" is displayed as medium size. Note that when doing so, the display control section 54 reduces the size of the numerical value 66 "4" compared to its size when the position R was passing the position "4". Namely, the numerical value 66 "4" is returned to medium size from large size.

In this manner, the display control section 54 changes the corresponding numerical value 66 from small size to medium size as the position R approaches this numerical value 66, and then changes this numerical value 66 to large size when the position R has reached this numerical value 66. The numerical value 66 is then changed from large size to medium size, and then from medium size to small size when this numerical value 66 is passed by. Note that although a case in which the position R is moving clockwise, namely a case in which the revs are increasing, has been described above, the display control section 54 also performs similar control in cases in which the position R is moving anticlockwise, namely in cases in which the revs are decreasing. However, in cases in which the revs are decreasing, namely in cases in which the position R is moving anticlockwise, the display control section 54 displays any numerical values 66 that are not included in the value indicated by the right side end of the number bar 68 with a lower brightness than the other numerical values 66.

Namely, the tone of the numerical values 66 not included in the value indicated by the right side end of the number bar 68 is reduced.

Display Processing

Figure 8A:
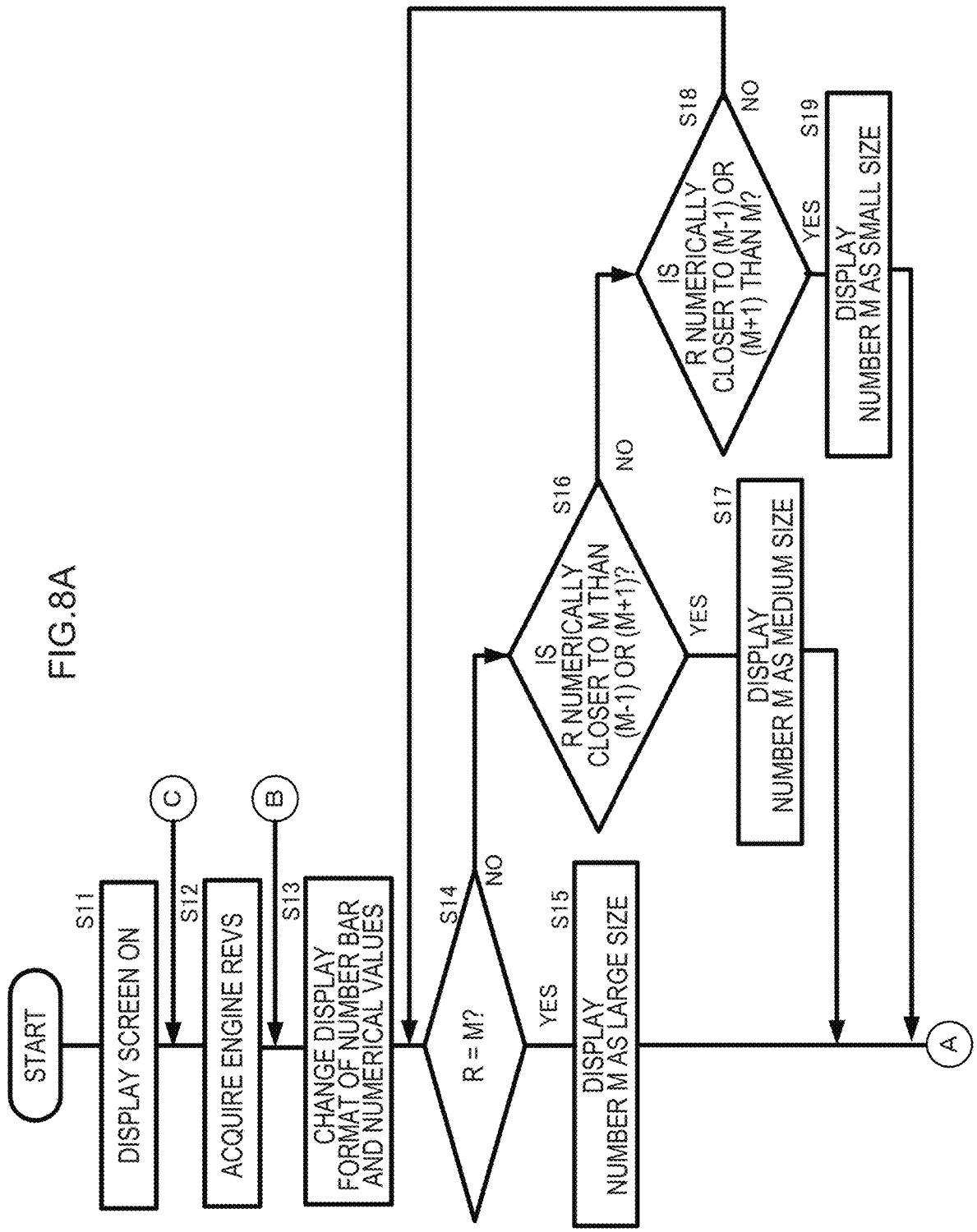
FIG. 8A is a flowchart (1) illustrating an example of a flow of display processing in an exemplary embodiment.

Next, explanation follows regarding vehicular display control processing executed by the display control ECU 28, with reference to the flowcharts illustrated in FIG. 8A and FIG. 8B The display control processing is executed by the CPU 40A reading a display control program from the ROM 40B or the storage 40D, and expanding and executing this program in the RAM 40C. Note that the processing is started when an instruction has been made to the display control ECU 28 to switch the display screen ON.

As illustrated in FIG. 8A, at step S11, the display control ECU 28 switches the display screen (image display region V1) of the first display section 24 and the head-up display device 44 (display region V2) ON.

Next at step S12, the acquisition section 52 acquires the current engine revs. Then, at step S13, the display control section 54 changes the display format of the number bar 68 and the numerical values 66 displayed in the image display region V1 based on the engine revs acquired by the acquisition section 52. More particularly, the display control section 54 displays the number bar 68 such that the right side end of the number bar 68 gradually extends until reaching a value that is the current engine revs divided by 1000. When doing so, the display control section 54 changes the display format of the numerical values 66 according to the position R of the right side end of the number bar 68. More particularly, the tone of any numerical values 66 included in the value indicated by the position R is intensified, and the display size of the numerical values 66 is changed according to the position of the position R.

More particularly, at step S14, the display control section 54 determines whether or not the position R is at a numerical value 66 "M". Note that M corresponds to the integers 1, 2, and so on. In cases in which the position R is at the numerical value 66 "M" at step S14 (step S14: YES), at step S15, the display control section 54 displays this numerical value 66 "M" as large size as described previously.

On the other hand, in cases in which the position R is not at the numerical value 66 "M" at step S14 (step S14: NO), at step S16, the display control section 54 determines whether or not the position R is numerically closer to the numerical value 66 "M" than to numerical values 66 "M−1" or "M+1". In cases in which the position R is numerically closer to the numerical value 66 "M" than to the numerical values 66 "M−1" or "M+1" at step S16 (step S16: YES), at step S17, the display control section 54 displays the numerical value 66 "M" as medium size as described previously.

In cases in which the position R is not numerically closer to the numerical value 66 "M" than to the numerical values 66 "M−1" or "M+1" at step S16 (step S16: NO), at step S18, the display control section 54 determines whether or not the position R is numerically closer to the numerical values 66 "M−1" or "M+1" than to the numerical value 66 "M". In cases in which the position R is numerically closer to the numerical values 66 "M−1" or "M+1" than to the numerical value 66 "M" at step S18 (step S18: YES), at step S19, the display control section 54 displays the numerical value 66 "M" as small size as described previously.

In cases in which the position R is not numerically closer to the numerical values 66 "M−1" or "M+1" than to the numerical value 66 "M" at step S18 (step S18: NO), the CPU 40A transitions to the processing of step S14, and repeats the processing from step S14 onward.

When the display control section 54 has performed the corresponding display at step S15, step S17, or step S19, as illustrated in FIG. 8B, at step S20, the display control section 54 determines whether or not the position R is positioned at the revs acquired at step S12. In cases in which the position R is not positioned at the revs acquired at step S12 at step S20 (step S20: NO), the CPU 40A transitions to the processing of step S13 as illustrated in FIG. 8A and repeats the processing of step S13 onward until the position R is positioned at the revs acquired at step S12.

On the other hand, in cases in which the position R is positioned at the revs acquired at step S12 at step S20 illustrated in FIG. 8B (step S20: YES), at step S21, the CPU 40A determines whether or not an instruction to switch the display screen OFF has been made. In cases in which an OFF instruction has not been made (step S21: NO), the CPU 40A transitions to the processing of step S12, and the repeats the processing of step S12 onward. On the other hand, in cases in which an OFF instruction has not been made at step S21 (step S21: YES), at step S22, the display control ECU 28 switches the display screen (image display region V1) of the first display section 24 and the head-up display device 44 (display region V2) OFF, and ends the series of processing.

In this manner, the display control ECU 28 changes the display format of the number bar 68 and the numerical values 66 displayed in the image display region V1 based on the current engine revs acquired by the acquisition section 52 until the display screen is switched OFF.

Operation and Advantageous Effects

Next, explanation follows regarding operation and advantageous effects of the present exemplary embodiment.

The display control ECU 28, serving as a vehicular display control device according to the present exemplary embodiment, changes the display format of the numerical values 66 in the image display region V1 for displaying the predetermined range of the engine revs of the vehicle 12, serving as a vehicle travel state-related physical quantity, in increments using the numerical values, based on the current engine revs of the vehicle 12 acquired by the acquisition section 52. This enables the format of more important information to be changed when being displayed, thereby enabling a user to view the required information without having to consciously process the information, even when in an analog display format.

In the display control ECU 28 serving as a vehicular display control device according to the present exemplary embodiment, the display control section 54 enlarges the display of the numerical value 66 that is numerically closest to the current engine revs of the vehicle 12 acquired by the acquisition section 52. This enables larger display of more important information, thereby enabling the user to view the required information without having to consciously process the information, even when in an analog display format.

In the display control ECU 28 serving as a vehicular display control device according to the present exemplary embodiment, the display control section 54 displays the numerical value 66 that the current engine revs of the vehicle 12 acquired by the acquisition section 52 passed larger than the other numerical values 66 at the point in time when the revs passed this numerical value 66. This enables larger display of the numerical value 66 that the current engine revs of the vehicle 12 acquired by the acquisition section 52 passed, thereby enabling the user to view partway values when the current engine revs are increasing or decreasing.

In the display control ECU 28 serving as a vehicular display control device according to the present exemplary embodiment, the display control section 54 displays a region spanning from a minimum value to the current engine revs in the predetermined range of the engine revs of the vehicle 12 in the form of the continuous number bar 68. Thus, the region that has been passed in the predetermined range displayed in increments using the numerical values 66 is covered by the number bar 68, thereby enabling the current numerical value indicated by the right side end (leading end) of the number bar 68 to be more evident.

In the display control ECU 28 serving as a vehicular display control device according to the present exemplary embodiment, the display control section 54 displays the number bar 68 with a gradation such that the right side end side (leading end side) thereof is emphasized. More particularly, the swept region 68B including the number bar 68 is displayed with a gradation so as to emphasize the leading end side 68A thereof. The right side end side (leading end side) of the number bar 68 is emphasized by this gradation, thereby enabling the current numerical value indicated by the right side end side (leading end side) of the number bar 68 to be even more evident.

Moreover, the vehicular display device 10 according to the present exemplary embodiment includes the first display section 24 provided with the image display region V1 and the display control ECU 28, such that similar operation and advantageous effects to those of the display control ECU 28 described above are obtained.

Moreover, the vehicle 12 according to the present exemplary embodiment includes the vehicular display device 10, such that similar operation and advantageous effects to those of the display control ECU 28 described above are obtained, similarly to the vehicular display device 10.

Moreover, a vehicular display control method and a vehicular display control program according to the present exemplary embodiment also obtain similar operation and advantageous effects to those of the display control ECU 28 described above.

Although in the above exemplary embodiment the display control section 54 displays the swept region 68B with a gradation so as to emphasize the leading end side 68A thereof by deepening the color and increasing the brightness on progression clockwise around the circumferential direction from 0 rpm the present disclosure is not limited thereto, and the swept region 68B does not have to be displayed with a gradation. Moreover, a configuration may be applied in which only the number bar 68 is displayed without displaying the swept region 68B.

Moreover, although in the above exemplary embodiment the display control section 54 displays the corresponding numerical value 66 larger than the other numerical values 66 as a means of emphatically displaying this numerical value 66, the present disclosure is not limited thereto. For example, the corresponding numerical value 66 may be displayed in a color that stands out more than that of the other numerical values, may be displayed as a flashing numerical value, or may be changed in another manner as appropriate.

Moreover, although in the above exemplary embodiment the vehicle 12 is a vehicle including an engine (reciprocal engine) serving as a travel drive source, and the acquisition section 52 acquires the engine revs of the vehicle 12, the present disclosure is not limited thereto. For example, in cases in which the vehicle 12 is a fuel cell electric vehicle (FCEV) or a battery electric vehicle (BEV), the acquisition section 52 may acquire the power of a motor installed in the vehicle 12 as a vehicle travel state-related physical quantity. In such cases, the image 60 is an image indicating motor power, in which an image for indicating the motor power is located at a central portion thereof. Similarly to in the above exemplary embodiment, a narrow-width calibrated scale with a circular arc shape and a range of the motor power are displayed in increments using numerical values in the image.

Alternatively, the acquisition section 52 may acquire the current vehicle speed of the vehicle 12 as a vehicle travel state-related physical quantity, regardless of the type of the vehicle 12. In such cases, the image 60 is an image indicating vehicle speed, in which an image for indicating the vehicle speed is located at a central portion thereof. Similarly to in the above exemplary embodiment, a narrow-width calibrated scale with a circular arc shape and a range of the vehicle speed are displayed in increments using numerical values in the image.

Note that the acquisition section 52 acquires at least one physical quantity selected from the group consisting of the engine revs of the vehicle 12, the motor power of the vehicle 12, and the vehicle speed of the vehicle 12 as a vehicle travel state-related physical quantity, and may acquire two or all of these physical quantities. In such cases, plural images 60 may be displayed in the image display region V1 according to the number of physical quantities acquired by the acquisition section 52. Since in the present disclosure, the vehicle travel state-related physical quantity is at least one physical quantity selected from the group consisting of the engine revs of the vehicle 12, the motor power of the vehicle 12, and the vehicle speed of the vehicle 12, the present disclosure may be applied to various vehicles, such as fuel cell vehicles, electric vehicles, hybrid electric vehicles (HEVs), and plug-in hybrid electric vehicles (PHEVs).

Although in the above exemplary embodiment the display screen illustrated in FIG. 4 to FIG. 7 has been given as an example of a display screen displayed by the display control section 54, the present disclosure is not limited thereto, and a different layout may be applied as required.

Figure 9:
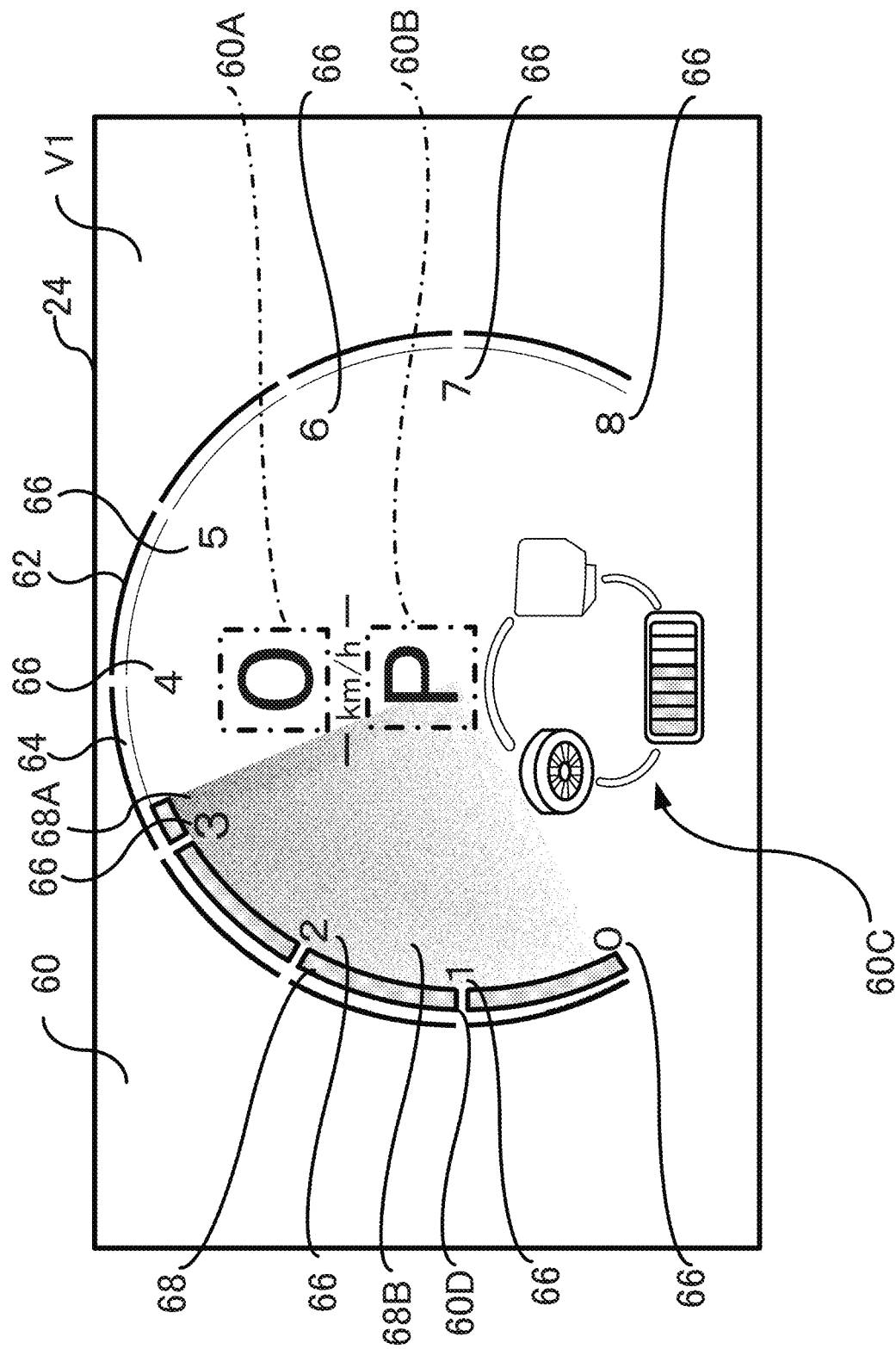
FIG. 9 is a diagram illustrating an another example of a display on a display section of an exemplary embodiment when engine revs are at 3300 rpm.

As illustrated in FIG. 9, a predetermined range of a vehicle travel state-related physical quantity may be displayed in divided increments using numerical values in the image display region V1. Namely, the calibrated scale 64 and the number bar 68 may be divided at predetermined intervals by gaps 60D. In such cases, since the display screen illustrating the predetermined range of the physical quantity is divided, the quantities indicated by the numerical values 66 in the predetermined range can be easily seen. Note that configuration may be such that only the calibrated scale 64 is divided.

Moreover, although in the above exemplary embodiment the calibrated scale 64 and the number bar 68 each have a circular arc shape, the present disclosure is not limited thereto. As illustrated in FIG. 10, an image 70, serving as a display screen, may be displayed in the image display region V1 of first display section 24 while in the sports mode. The image 70 is an image indicating the engine revs in which a meter image 72 for indicating the engine revs is located at an upper-central portion thereof. A narrow-width, straight calibrated scale 74 is arrayed along a horizontal direction in the meter image 72. A range of the engine revs spanning from 0 rpm to 8000 rpm is displayed in increments using numerical values 76 "1" to "8" on the calibrated scale 74. Note that "×1000" may also be displayed in the image display region V1 so as to indicate that the engine revs is a value obtained by multiplying the numerical value indicated on the calibrated scale 74 by 1000.

Note that a colored number bar (bar) 78 indicating the current engine revs is located alongside the calibrated scale 74. A left side end of the number bar 78 is at 0 rpm, and a right side end of the number bar 78 extends or contracts according to the engine revs so as to display the engine revs. Namely, the current engine revs is a value obtained by multiplying the numerical value indicated by the circumferential direction right side end of the number bar 78 by 1000. In this manner, even in cases in which the calibrated scale 74 and the number bar 78 are displayed as straight shapes, the display control section 54 can change the display format of the numerical values 76 based on the current engine revs acquired by the acquisition section 52, similarly to in the above exemplary embodiment.

Moreover, there is no particular limitation to the number and shape of the respective operating switches and the respective function switchover switches, which may be changed as appropriate.

Moreover, although in the above exemplary embodiment the display control section 54 displays the image 60 or the image 70 in the image display region V1, the present disclosure is not limited thereto, and the corresponding image may be displayed in the display region V2.

Note that the respective processing executed by the CPU 40A illustrated in FIG. 2 reading and executing software (a program) in the above exemplary embodiment may be executed by various types of processors other than a CPU. Such processors include programmable logic devices (PLDs) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The respective processing may be executed by any one of these various types of processors, or by a combination of two or more of the same type or different types of processors (such as plural FPGAs, or a combination of a CPU and an FPGA). The hardware structure of these various types of processors is more particularly an electric circuit combining circuit elements such as semiconductor elements.

The respective programs described in the present exemplary embodiment may be provided in a format recorded on a non-transitory computer-readable recording medium such as Compact Disc Read Only Memory (CD-ROM), Digital Versatile Disc Read Only Memory (DVD-ROM), or Universal Serial Bus (USB) memory. Alternatively, the programs may be provided in a format downloadable from an external device through a network.

Although an exemplary embodiment of the present disclosure has been described above, the present disclosure is not limited to the above description, and various other modifications may be implemented within a range not departing from the spirit of the present disclosure.

The present disclosure provides a vehicular display control device, a vehicular display device, a vehicle, a vehicular display control method, and a non-transitory computer-readable recording medium recorded with a vehicular display control program that enable a user to view required information without having to consciously process the information, even when in an analog display format.

A first aspect of the present disclosure is a vehicular display control device, that includes: a memory; and a processor coupled to the memory, the processor being configured to: acquire a physical quantity relating to a travel state of a vehicle; in a display region for displaying a predetermined range of the vehicle travel state-related physical quantity in increments using numerical values, change a display format of the numerical values based on the acquired vehicle travel state-related physical quantity; and display the numerical values for which the display format has been changed on a display including the display region.

In the vehicular display control device according to the first aspect of the present disclosure, the display format of the numerical values in the display region for displaying the predetermined range of the vehicle travel state-related physical quantity in increments using numerical values is changed based on the acquired vehicle travel state-related physical quantity. This enables the format of more important information to be changed when being displayed, thereby enabling a user to view the required information without having to consciously process the information, even when in an analog display format.

A second aspect of the present disclosure is the vehicular display control device of the first aspect, wherein the processor is configured to emphatically display a numerical value that is numerically closest to the acquired vehicle travel state-related physical quantity.

In the vehicular display control device according to the second aspect of the present disclosure, the numerical value that is numerically closest to the acquired vehicle travel state-related physical quantity is emphatically displayed. This enables more important information to be emphatically displayed, thereby enabling the user to view the required information without having to consciously process the information, even when in an analog display format.

A third aspect of the present disclosure is the vehicular display control device of the second aspect, wherein the processor is configured to display the numerical value that is numerically closest to the acquired vehicle travel state-related physical quantity so as to be displayed larger than other numerical values.

In the vehicular display control device according to the third aspect of the present disclosure, the numerical value that is numerically closest to the acquired vehicle travel state-related physical quantity is displayed larger than other numerical values. This enables larger display of more important information, thereby enabling the user to view the required information without having to consciously process the information, even when in an analog display format.

A fourth aspect of the present disclosure is the vehicular display control device of the first or second aspect, wherein the processor is configured to emphatically display a numerical value that the acquired vehicle travel state-related physical quantity has passed in response to the physical quantity having passed the numerical value.

In the vehicular display control device according to the fourth aspect of the present disclosure, the numerical value that the acquired vehicle travel state-related physical quantity passed is emphatically displayed at the point in time when the physical quantity passed this numerical value. This enables the numerical value that the acquired vehicle travel state-related physical quantity passed to be emphatically displayed, thereby enabling the user to view partway values when the physical quantity is increasing or decreasing.

A fifth aspect of the present disclosure is the vehicular display control device of the fourth aspect, wherein the processor is configured to display the numerical value that the acquired vehicle travel state-related physical quantity has passed so as to be displayed larger than other numerical values in response to the physical quantity having passed the numerical value.

In the vehicular display control device according to the fifth aspect of the present disclosure, the numerical value that the acquired vehicle travel state-related physical quantity passed is displayed larger than the other numerical values at the point in time when the physical quantity passed this numerical value. This enables larger display of the numerical value that the acquired vehicle travel state-related physical quantity passed, thereby enabling the user to view partway values when the physical quantity is increasing or decreasing.

A sixth aspect of the present disclosure is the vehicular display control device of any of the first to the fifth aspects, wherein the processor is configured to display a continuous bar spanning from a minimum value to a current physical quantity, within the predetermined range of the vehicle travel state-related physical quantity.

In the vehicular display control device according to the sixth aspect of the present disclosure, the continuous bar is displayed spanning from the minimum value to the current physical quantity in the predetermined range of the vehicle travel state-related physical quantity. Thus, a region that has been passed in the predetermined range displayed in increments using the numerical values is covered by the bar, thereby enabling the current numerical value indicated by a leading end of the bar to be more evident.

A seventh aspect of the present disclosure is the vehicular display control device of the sixth aspect, wherein the processor is configured to display the bar configured with a gradation so as to emphasize a leading end of the bar.

In the vehicular display control device according to the seventh aspect of the present disclosure, the bar is displayed with a gradation so as to emphasize the leading end side thereof. The leading end side of the bar is emphasized by this gradation, thereby enabling the current numerical value indicated by the leading end side of the bar to be even more evident.

An eighth aspect of the present disclosure is the vehicular display control device of any of the first to the seventh aspects, wherein the processor is configured to display the predetermined range of the vehicle travel state-related physical quantity in divided increments using the numerical values.

In the vehicular display control device according to the eighth aspect of the present disclosure, the display region displays the predetermined range of the vehicle travel state-related physical quantity in divided increments using the numerical values. Since the display of the predetermined range is divided, the quantities indicated by the numerical values in the predetermined range can be easily seen.

A ninth aspect of the present disclosure is the vehicular display control device of any of the first to the eighth aspects, wherein the vehicle travel state-related physical quantity is at least one physical quantity selected from the group consisting of engine revolutions of the vehicle, a power of a motor of the vehicle, and a vehicle speed of the vehicle.

In the vehicular display control device according to the ninth aspect of the present disclosure, the vehicle travel state-related physical quantity is at least one physical quantity selected from the group consisting of the engine revs of the vehicle, the motor power of the vehicle, and the vehicle speed of the vehicle. This enables application to various vehicles, such as fuel cell vehicles, electric vehicles, hybrid vehicles, and plug-in hybrid vehicles.

A tenth aspect of the present disclosure is a vehicular display device, that includes: the vehicular display control device of any of the first to the ninth aspects: and a display.

The vehicular display device according to the tenth aspect of the present disclosure includes the display that displays the display region, and the vehicular display control device of any one of the first aspect to the ninth aspect. Since this vehicular display control device is the vehicular display control device of any one of the first aspect to the ninth aspect, the operation and advantageous effects described above are obtained.

An eleventh aspect of the present disclosure is a vehicle, that includes the vehicular display device of the tenth aspect.

The vehicle according to the eleventh aspect of the present disclosure includes the vehicular display device of the tenth aspect. Since the vehicular display device is the vehicular display device of the tenth aspect and its vehicular display control device is the vehicular display control device of any one of the first aspect to the ninth aspect, the operation and advantageous effects described above are obtained.

A twelfth aspect of the present disclosure is a vehicular display control method, that includes: by a processor: acquiring a physical quantity relating to a travel state of a vehicle, in a display region for displaying a predetermined range of the vehicle travel state-related physical quantity in increments using numerical values, changing a display format of the numerical values based on the acquired vehicle travel state-related physical quantity, and displaying the numerical values for which the display format has been changed on a display including the display region.

In the vehicular display control method according to the twelfth aspect of the present disclosure, the vehicle travel state-related physical quantity is acquired, and the display format of the numerical values in the display region for displaying the predetermined range of the vehicle travel state-related physical quantity in increments using the numerical values is changed based on the acquired vehicle travel state-related physical quantity. This enables the format of more important information to be changed when being displayed, thereby enabling the user to view the required information without having to consciously process the information, even when in an analog display format.

A thirteenth aspect of the present disclosure is a non-transitory computer-readable recording medium storing a vehicular display control program executable by a computer to perform processing, the processing that includes: acquiring a physical quantity relating to a travel state of a vehicle; in a display region for displaying a predetermined range of the vehicle travel state-related physical quantity in increments using numerical values, changing a display format of the numerical values based on the acquired vehicle travel state-related physical quantity; and displaying the numerical values for which the display format has been changed on a display including the display region.

In the non-transitory computer-readable recording medium storing the vehicular display control program according to the thirteenth aspect of the present disclosure, a computer is caused to execute processing to acquire the vehicle travel state-related physical quantity, and to change the display format of the numerical values in the display region for displaying the predetermined range of the vehicle travel state-related physical quantity in increments using the numerical values based on the acquired vehicle travel state-related physical quantity. This enables the format of more important information to be changed when being displayed, thereby enabling the user to view the required information without having to consciously process the information, even when in an analog display format.

As described above, the vehicular display control device, the vehicular display device, the vehicle, the vehicular display control method, and the vehicular display control program according to the present disclosure exhibit an excellent advantageous effect of enabling the user to view important information without having to consciously process the information, even when in an analog display format.

What is claimed is:

1. A vehicular display control device, comprising:
   a memory; and
   a processor coupled to the memory, the processor being configured to:
   acquire a physical quantity relating to a travel state of a vehicle;
   in a semi-circular or circular display region displaying a predetermined range of the vehicle travel state-related physical quantity along a circumference of the semi-circular or circular display region in increments using numerical values;
   change a display format of the numerical values based on the acquired vehicle travel state-related physical quantity;
   display the numerical values for which the display format has been changed on a display including the display region; and
   display a continuous circular sector spanning from a minimum value to the current physical quantity within the predetermined range of the vehicle travel state-related physical quantity, the circular sector spanning across a portion of the circumference of the semi-circular or circular display, and including two radii extending from the circumference to a center of the semi-circular or circular display.

2. The vehicular display control device of claim 1, wherein the processor is configured to emphatically display a numerical value that is numerically closest to the acquired vehicle travel state-related physical quantity.

3. The vehicular display control device of claim 2, wherein the processor is configured to display the numerical value that is numerically closest to the acquired vehicle travel state-related physical quantity so as to be displayed larger than other numerical values.

4. The vehicular display control device of claim 1, wherein the processor is configured to emphatically display a numerical value that the acquired vehicle travel state-related physical quantity has passed in response to the physical quantity having passed the numerical value.

5. The vehicular display control device of claim 4, wherein the processor is configured to display the numerical value that the acquired vehicle travel state-related physical quantity has passed so as to be displayed larger than other numerical values in response to the physical quantity having passed the numerical value.

6. The vehicular display control device of claim 1, wherein the processor is configured to display the circular sector configured with a gradation so as to emphasize a radius of the circular sector corresponding to the current physical quantity.

7. The vehicular display control device of claim 1, wherein the processor is configured to display the predetermined range of the vehicle travel state-related physical quantity in divided increments using the numerical values.

8. The vehicular display control device of claim 1, wherein the vehicle travel state-related physical quantity is at least one physical quantity selected from the group consisting of engine revolutions of the vehicle, a power of a motor of the vehicle, and a vehicle speed of the vehicle.

9. A vehicular display device, comprising:
   the vehicular display control device of claim 1; and
   a display.

10. A vehicle, comprising the vehicular display device of claim 9.

11. A vehicular display control method, comprising:
    by a processor:
    acquiring a physical quantity relating to a travel state of a vehicle,
    in a semi-circular or circular display region, displaying a predetermined range of the vehicle travel state-related physical quantity along a circumference of the semi-circular or circular display region in increments using numerical values,
    changing a display format of the numerical values based on the acquired vehicle travel state-related physical quantity,
    displaying the numerical values for which the display format has been changed on a display including the display region, and
    displaying a continuous circular sector spanning from a minimum value to the current physical quantity within the predetermined range of the vehicle travel state-related physical quantity, the circular sector spanning across a portion of the circumference of the semi-circular or circular display, and including two radii extending from the circumference to a center of the semi-circular or circular display.

12. The vehicular display control method of claim 11, comprising emphatically displaying a numerical value that is numerically closest to the acquired vehicle travel state-related physical quantity.

13. A non-transitory computer-readable recording medium storing a vehicular display control program executable by a computer to perform processing, the processing comprising:
    acquiring a physical quantity relating to a travel state of a vehicle;
    in a semi-circular or circular display region displaying a predetermined range of the vehicle travel state-related physical quantity in increments using numerical values;
    changing a display format of the numerical values based on the acquired vehicle travel state-related physical quantity;
    displaying the numerical values for which the display format has been changed on a display including the display region; and
    displaying a continuous circular sector spanning from a minimum value to the current physical quantity within the predetermined range of the vehicle travel state-related physical quantity, the circular sector spanning across a portion of the circumference of the semi-circular or circular display, and including two radii extending from the circumference to a center of the semi-circular or circular display.

14. The non-transitory computer-readable recording medium of claim 13, wherein the processing comprises emphatically displaying a numerical value that is numerically closest to the acquired vehicle travel state-related physical quantity.

* * * * *